US008995247B2

(12) United States Patent
Chappel et al.

(10) Patent No.: US 8,995,247 B2
(45) Date of Patent: Mar. 31, 2015

(54) DEVICE TRIGGERED WAKE UP OF POWERLINE COMMUNICATION DEVICES

(71) Applicant: QUALCOMM Incorporated, San Diego, CA (US)

(72) Inventors: John Fraser Chappel, Ontario (CA); Ehab Tahir, Ontario (CA); Richard David Roze, Ontario (CA); Brian James Langlais, Ontario (CA); Joubin Karimi, Ontario (CA)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 13/735,966

(22) Filed: Jan. 7, 2013

(65) Prior Publication Data

US 2014/0192912 A1 Jul. 10, 2014

(51) Int. Cl.
*H04B 1/00* (2006.01)
*H04L 27/22* (2006.01)
*G06F 1/32* (2006.01)
*H04L 27/26* (2006.01)

(52) U.S. Cl.
CPC .......... *G06F 1/3206* (2013.01); *H04L 27/2605* (2013.01); *H04L 27/2655* (2013.01)
USPC ........... 370/203; 370/208; 370/441; 375/257; 375/340; 340/310.11; 340/538

(58) Field of Classification Search
None
See application file for complete search history.

(56) References Cited

U.S. PATENT DOCUMENTS

| 6,134,215 | A | 10/2000 | Agrawal et al. |
| 6,484,082 | B1 | 11/2002 | Millsap et al. |
| 7,154,846 | B2 | 12/2006 | Chen et al. |
| 7,317,732 | B2 | 1/2008 | Mills et al. |
| 7,680,090 | B2 | 3/2010 | Welborn |
| 7,760,699 | B1 | 7/2010 | Malik |
| 7,856,008 | B2 | 12/2010 | Ayyagari et al. |

(Continued)

FOREIGN PATENT DOCUMENTS

| EP | 1079561 | 2/2001 |
| EP | 1158718 | 11/2001 |

(Continued)

OTHER PUBLICATIONS

PCT Application No. PCT/2013/062027 International Search Report and Written Opinion, Mar. 18, 2014, 13 pages.

(Continued)

*Primary Examiner* — Chi H Pham
*Assistant Examiner* — Soon-Dong D Hyun
(74) *Attorney, Agent, or Firm* — DeLizio Gilliam, PLLC

(57) ABSTRACT

A first network device detects at least a first orthogonal code included in a preamble of a network packet received at the first network device from a second network device in an orthogonal frequency division multiplexing (OFDM) communication network. The first network device determines whether the first orthogonal code included in the preamble is associated with an assigned orthogonal code for the first network device. The assigned orthogonal code for the first network device is orthogonal to other assigned orthogonal codes for other network devices in the OFDM communication network. An operational mode of the first network device is changed from a sleep mode to an awake mode in response to determining the first orthogonal code is associated with the assigned orthogonal code for the first network device.

32 Claims, 6 Drawing Sheets

(56) References Cited

U.S. PATENT DOCUMENTS

| | | |
|---|---|---|
| 8,165,172 B2 | 4/2012 | Razazian et al. |
| 2006/0072604 A1* | 4/2006 | Sutivong et al. ............. 370/437 |
| 2008/0130770 A1 | 6/2008 | Khandekar et al. |
| 2008/0186935 A1* | 8/2008 | Ling et al. .................... 370/342 |
| 2009/0054033 A1 | 2/2009 | Pratt, Jr. et al. |
| 2009/0103642 A1* | 4/2009 | Galli et al. ................... 375/260 |
| 2009/0175158 A1 | 7/2009 | Shamburger |
| 2009/0175321 A1* | 7/2009 | Sasaki et al. ................. 375/219 |
| 2009/0252200 A1 | 10/2009 | Dohler et al. |
| 2009/0268752 A1* | 10/2009 | Miyazaki et al. ............. 370/458 |
| 2010/0195503 A1 | 8/2010 | Raleigh |
| 2010/0272192 A1* | 10/2010 | Varadarajan et al. ......... 375/257 |
| 2012/0093198 A1 | 4/2012 | Dabak et al. |
| 2012/0106517 A1 | 5/2012 | Charbit et al. |
| 2012/0314744 A1* | 12/2012 | Vedantham et al. .......... 375/222 |
| 2013/0268920 A1 | 10/2013 | Ursal et al. |
| 2014/0092774 A1 | 4/2014 | Karimi et al. |

FOREIGN PATENT DOCUMENTS

| | | |
|---|---|---|
| KR | 2000061118 | 10/2000 |
| WO | 1998059429 | 12/1998 |
| WO | 2014052660 | 4/2014 |

OTHER PUBLICATIONS

PCT Application No. PCT/2013/062027 Partial International Search Report (Annex to PCT/ISA/206), Jan. 24, 2014, 5 pages.

Co-pending U.S. Appl. No. 13/838,678, filed Mar. 15, 2013, 48 pages.

"PCT Written Opinion PCT/US2013/062027, mailed Sep. 5, 2014", Sep. 5, 2014, 7 pages.

"U.S. Appl. No. 13/838,678 Office Action", Dec. 2, 2014, 35 Pages.

\* cited by examiner

DEVICE TRIGGERED WAKE UP OF POWERLINE COMMUNICATION DEVICES

BACKGROUND

Embodiments of the inventive subject matter generally relate to the field of communication networks, and, more particularly, to waking up powerline communication (PLC) devices in a PLC network.

PLC devices can conserve power by switching between an active state (i.e., an awake mode) and a low power state (i.e., a sleep mode). A PLC device can enter the sleep mode based on a predetermined sleep schedule which may specify repeating sleep durations. On completion of the sleep duration, the PLC device can enter the awake mode. In some cases, a first PLC device may have to communicate with a second PLC device which is in the sleep mode. In this scenario, the communication with the second PLC device is typically delayed by the first PLC device until the second PLC device is in the awake mode.

SUMMARY

Various embodiments are disclosed for waking up devices in an orthogonal frequency division multiplexing (OFDM) communication network. In one embodiment, at a first network device that is in a sleep mode, at least a first orthogonal code included in a preamble of a network packet received at the first network device from a second network device is detected. It is determined whether the first orthogonal code included in the preamble is associated with an assigned orthogonal code for the first network device. The assigned orthogonal code for the first network device is orthogonal to other assigned orthogonal codes for other network devices. An operational mode of the first network device is changed from the sleep mode to an awake mode in response to determining that the first orthogonal code is associated with the assigned orthogonal code for the first network device.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to waking up PLC devices in a PLC network, embodiments are not so limited. In other embodiments, network devices in any communication network utilizing orthogonal frequency division multiplexing (OFDM) may be woken up based on one or more activities on a communication medium. In other instances, well-known instruction instances, protocols, structures and techniques have not been shown in detail in order not to obfuscate the description.

In some embodiments, one or more PLC devices in a PLC network can implement a wake on powerline activity technique. The wake on powerline activity technique allows a PLC device to be woken up (from its sleep mode) based on network packets transmitted by one or more PLC devices on a powerline communication medium in the PLC network. The wake on powerline activity technique allows the PLC device to be woken up irrespective of a predetermined sleep schedule. In some implementations, the wake on powerline activity technique utilizes orthocodes to wake up a PLC device. Orthocodes are polyphase codes with a strong auto-correlation function and a weak cross-correlation with other similar polyphase codes. With a sufficient number of available orthocodes, a PLC device may be uniquely woken up without affecting other PLC devices in the PLC network.

In some embodiments, a PLC device which acts as a central coordinator may assign orthocodes to PLC devices in a PLC network. A first orthocode assigned to a first PLC device can be utilized by one or more PLC devices in the PLC network to wake up the first PLC device. For example, a second PLC device can configure a network packet with the first orthocode assigned to the first PLC device and send the network packet to wake up the first PLC device (when the first PLC device is in a sleep mode). One or more components in the first PLC device detect an orthocode in a network packet and determine whether the orthocode in the network packet is associated with the first orthocode. On determining that the orthocode in the network packet is associated with the first orthocode, the first PLC device can change its operational mode from the sleep mode to an awake mode.

Figure 1:
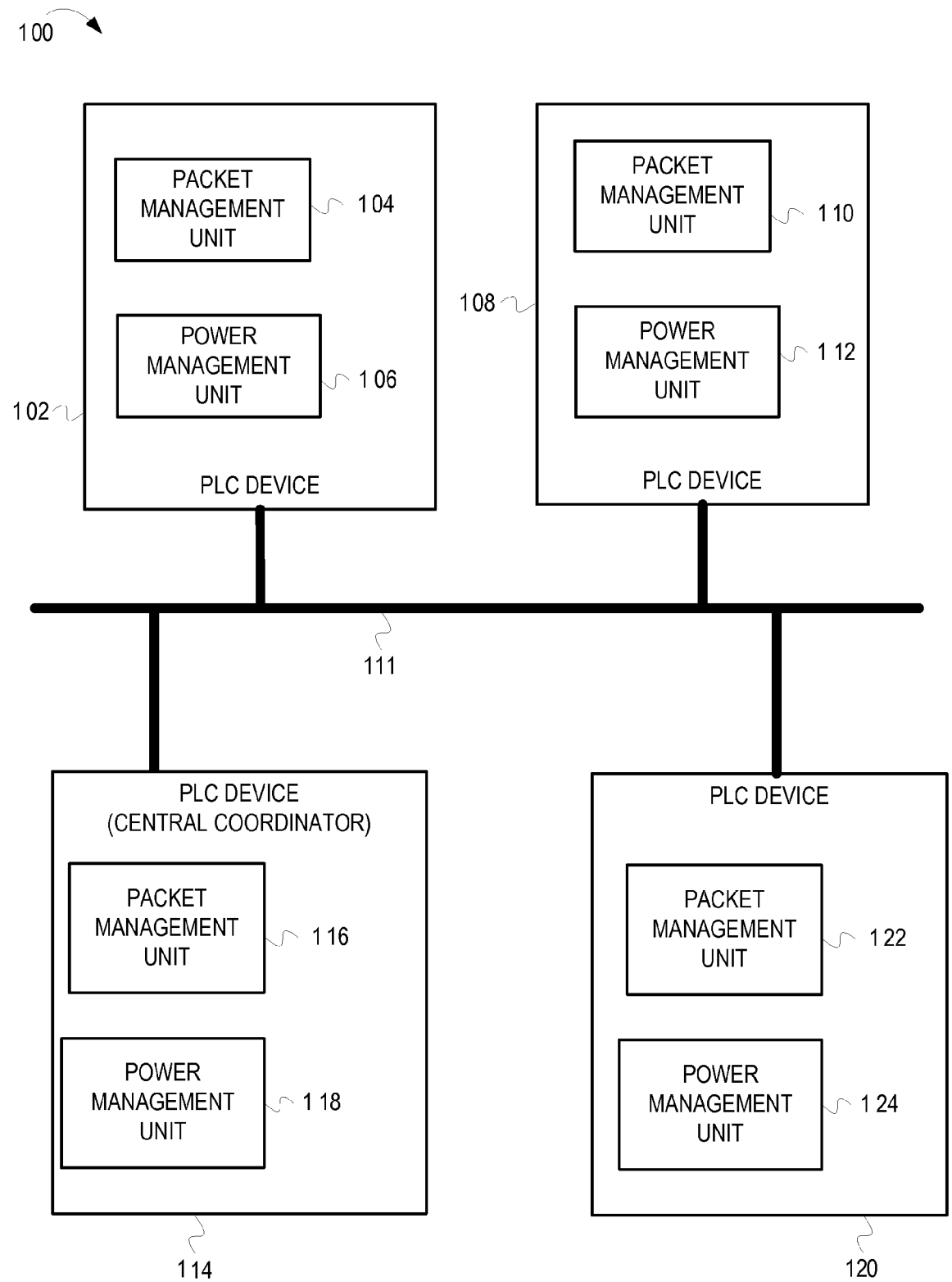
FIG. 1 depicts an example conceptual diagram of a PLC network with PLC devices capable of implementing a wake on powerline activity technique.

FIG. 1 depicts an example conceptual diagram of a PLC network with PLC devices capable of implementing a wake on powerline activity technique. FIG. 1 includes a PLC network 100. The PLC network 100 includes a PLC device 102 (e.g., a laptop, a washing machine, etc.) having a packet management unit 104 and a power management unit 106, a PLC device 108 having a packet management unit 110 and a power management unit 112, a PLC device 114 having a packet management unit 116 and a power management unit 118, and a PLC device 120 having a packet management unit 122 and a power management unit 124. The PLC devices 102, 108, 114, and 120 are communicatively coupled via a powerline communication medium 111 (e.g., a pair of electrical wires). Each of the PLC devices 102, 108, 114, 120 can communicate over the powerline communication medium 111 in the PLC network 100 and wake up one or more PLC devices from their sleep mode. For example, the PLC device 102 can wake up the PLC device 108 from its sleep mode by sending a network packet configured with an orthocode assigned to the PLC device 108.

In one implementation, the orthocode assigned to the PLC device 108 is assigned by a central coordinator in the PLC network 100. For example, the PLC device 114 in the PLC network acts as a central coordinator of the PLC network 100. The packet management unit 116 in the PLC device 114 determines the number of PLC devices in the PLC network 100 and accordingly assigns the orthocodes to each of the PLC devices. The packet management unit 116 assigns orthocodes such that an orthocode assigned to a PLC device is orthogonal to each of the other orthocodes assigned to other PLC devices in the PLC network 100. For example, the packet management unit 116 determines a set of orthocodes that can be assigned to PLC devices in the PLC network 100. In one implementation, the packet management unit 116 determines a set of polyphase codes such that each polyphase code in the set has a strong auto-correlation function and a weak cross-correlation with other polyphase codes in the set. For example, a correlation function may be considered strong when the value of correlation function is greater than a predetermined correlation threshold (e.g., the correlation threshold can be 0.8, when the result of correlation function lies between 0 and 1). Similarly, the correlation function may be considered weak when the value of correlation function is less than the correlation threshold. The polyphase codes in the set may be referred to as orthocodes. The number of orthocodes in the set is the number of orthocodes that the packet management unit 116 can assign to the PLC devices in the PLC network 100. The packet management unit 116 then assigns orthocodes to the PLC devices in the PLC network.

In one implementation, when the number of PLC devices in the PLC network is less than the number orthocodes in the set, the packet management unit 116 assigns a distinct orthocode from the set to each of the PLC devices in the PLC network. In one simplified example, the number of orthocodes in the set is six, and the number of PLC devices in the PLC network 100 is four (e.g., the PLC devices 102, 108, 114 and 120). The packet management unit 116 assigns four orthocodes from the six orthocodes in the set to the four PLC devices. In other implementations, when the number of orthocodes in the set is less than the number of PLC devices in the PLC network 100, the packet management unit 116 combines two or more orthocodes in a sequence to form distinct orthocode sequences and may assign the orthocode sequences to PLC devices in the PLC network 100. In one simplified example, the number of orthocodes in the set is four (namely A, B, C and D), and the number of PLC devices in the PLC network 100 is eight. The packet management unit 116 combines the four orthocodes to form distinct orthocode sequences e.g., A, B, C, D, AB, AC, AD, and BC. The packet management unit 116 then assigns the orthocodes (A, B, C, and D), and the orthocode sequences (AB, AC, AD, and BC) to the eight PLC devices in the PLC network 100. It is noted that the packet management unit 116 may utilize other available orthocode sequences (e.g., BD and CD) for additional PLC devices in the PLC network 100. In some implementations, the packet management unit 116 may utilize orthocode sequences formed by combinations of orthocodes in a different order (e.g., the reverse order combination BA of the orthocode AB, etc.) for additional PLC devices in the PLC network 100. In other implementations, the packet management unit 116 may utilize orthocode sequences formed by combining more than two orthocodes (e.g., ABC, BCD, BAC, etc.). Once the packet management unit 116 assigns orthocode sequences and/or orthocodes to the PLC devices in the PLC network 100, the respective orthocode or the orthocode sequence assigned to a PLC device may be utilized to wake up the PLC device.

In one implementation, the PLC device 102 configures a network packet with the orthocode or the orthocode sequence associated with the PLC device 108. The PLC device 102 may configure a preamble of the network packet with the orthocode or the orthocode sequence assigned to the PLC device 108, as will be further described below with reference to FIG. 2. For example, the packet management unit 104 of the PLC device 102 inserts the orthocode in the preamble and then transmits the network packet over the powerline communication medium 111 to wake up the PLC device 108 (which is initially in a sleep mode). The packet management unit 110 in the PLC device 108 detects an orthocode in the network packet transmitted from the PLC device 102. The packet management unit 110 determines whether the orthocode in the network packet is associated with the orthocode assigned to the PLC device 108. For example, the packet management unit 110 computes a correlation function of the orthocode in the network packet with the orthocode assigned to the PLC device 108. A strong correlation function indicates that the orthocode in the network packet is associated with the orthocode assigned to the PLC device 108, and the packet management unit 110 instructs the power management unit 112 to wake up the PLC device 108 (i.e., change the sleep mode of the PLC device 108 to its awake mode). It is noted that the PLC device 108 in the PLC network 100 may have a predetermined sleep schedule. For example, the sleep schedule defines repeating time intervals of sleep and awake modes for the PLC device 108. However, waking up the PLC device 108 based on a network packet received from a PLC device (e.g., the PLC device 102) in the PLC network 100 allows the PLC device to be woken up irrespective of the sleep schedule. Hence, the PLC device 102 can start communications with the PLC device 108 without having to wait for the PLC device 108 to wake up according to its sleep schedule.

The wake on powerline activity technique allows waking up a particular PLC device in the PLC network 100 without affecting other PLC devices. In some implementations, when a certain group of PLC devices are to be woken up together, an orthocode or an orthocode sequence may be assigned to the group of PLC devices. For example, a group of devices may be defined based on functional class of devices (such as smart grid appliances and computer devices). Smart grid appliances (e.g., a smart power meter, an HVAC thermostat, etc.) may be considered a first functional class of devices and may be defined as a first group of devices in the network. Similarly, computer devices (e.g., a desktop computer, a laptop computer, a printer, etc.) may be considered a second functional class of devices and may be defined as a second group of devices in the network. Each device in each corresponding group of devices may be woken up together using a common orthocode or orthocode sequence assigned to the respective group of devices. In some implementations, a PLC device may be a part of multiple functional classes of devices (e.g., a liquid crystal display (LCD) monitor may be a part of home automation system and also a part of computer peripheral devices) or other types of groups of devices. The PLC device which is a part of multiple functional classes of devices may be assigned multiple orthocodes for each respective functional class of devices. For example, the LCD monitor may be assigned a first orthocode to be woken up by the devices in the home automation system and a second orthocode to be woken up by the computer peripheral devices. In other examples, grouping may be based on association and communication amongst certain devices (such as a television, a digital video recorder (DVR), and a set-top box). The television, the DVR, and the set-top box can be woken up together using a single orthocode or orthocode sequence without affecting other devices. In some implementations, when the number of PLC devices in the PLC network 100 is greater than the number of orthocodes in a set (determined by the packet management unit 116), the packet management unit 116 may not combine orthocodes in the set to form orthocode sequences, but rather assign an orthocode in the set to more than one PLC device in the PLC network 100 (i.e., assign an orthocode to a group of PLC devices). The packet management unit 116 assigns the orthocodes to PLC devices in the PLC network 100 such that the orthocodes are equally distributed among the PLC devices in the PLC network 100. For example, with two orthocodes (a first orthocode and a second orthocode) in the set and four PLC devices (i.e., the PLC devices 102, 108, 114 and 120) in the PLC network 100, the packet management unit 116 assigns a first orthocode to the PLC devices 102 and 108. The packet management unit 116 assigns the second orthocode to the PLC devices 114 and 120. Equal distribution of a limited number of orthocodes amongst the PLC devices in the PLC network 100 allows waking up a minimum number of PLC devices in the PLC network 100 using the wake on powerline activity technique.

The wake on powerline activity technique further allows flexibility in utilizing dynamically assigned codes to PLC devices. For example, an orthocode or an orthocode sequence to wake up a particular PLC device may not necessarily be stored in the hardware of the PLC device. However, the orthocode or the orthocode sequence may be assigned to the PLC device by the PLC device 114 on joining the PLC network 100. Dynamically assigning orthocodes to PLC devices in the PLC network 100 also allows efficient allocation of orthocodes to the PLC devices in the PLC network 100. For example, initially when the number of PLC devices is less than the number of orthocodes in a set (determined by the PLC device 114), the PLC device 114 may assign an orthocode to each of the PLC devices in the PLC network 100. However, when more PLC devices join the PLC network 100 and the number of PLC devices in the PLC network 100 exceeds the number of orthocodes in the set, the PLC device 114 may assign a sequence of orthocodes to some PLC devices (or, if a grouping of PLC devices is available, assign an orthocode to two or more PLC devices in the PLC network 100). It is noted that dynamically assigning orthocodes to the PLC devices in the PLC network 100 allows PLC devices to be added or removed from the PLC network 100, and the assigned orthocodes are not permanent for the respective PLC devices. For example, when the PLC device 120 leaves the PLC network 100, the orthocode assigned to the PLC device 120 may be assigned to any other PLC device in the PLC network 100. Dynamically assigning orthocodes to the PLC devices in the PLC network 100 further allows relationships between the PLC devices to be changed. For example, when a PLC device which is a member of a first group of PLC devices (and assigned a first orthocode) disassociates from the first group and joins a second group, a second orthocode associated with the second group (and different from the first orthocode) may be assigned to the PLC device. After disassociating from the first group and joining the second group, the PLC device may be woken up when it receives the second orthocode but will not be woken up when it receives the first orthocode.

Figure 2:
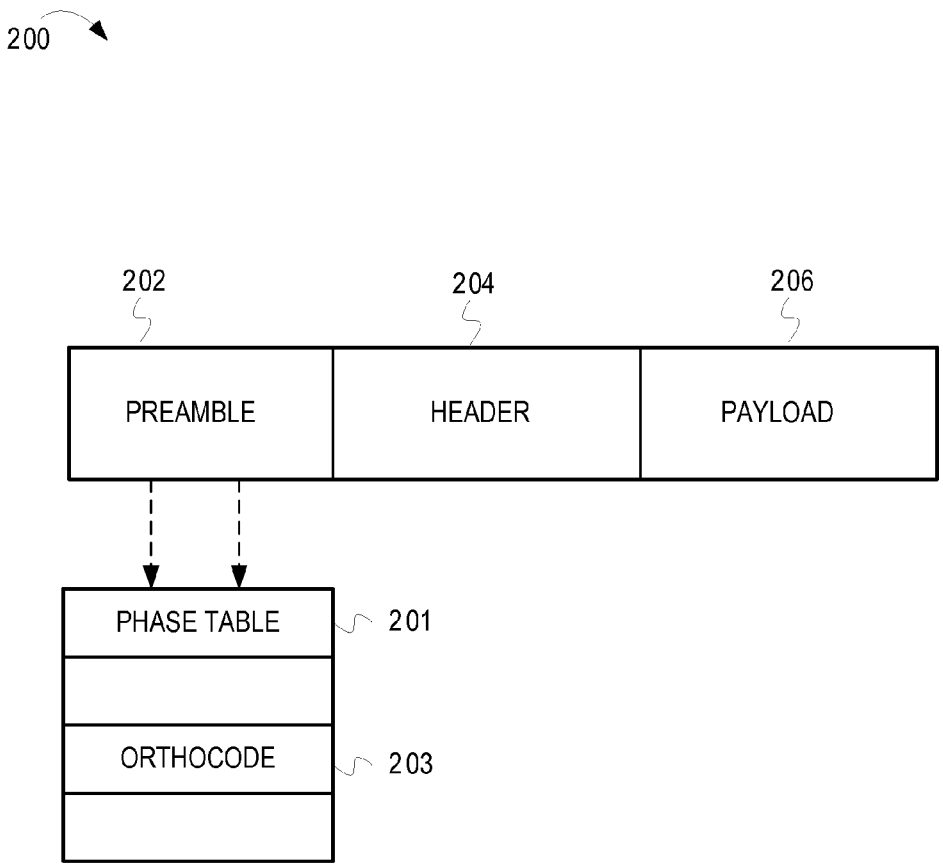
FIG. 2 depicts an example conceptual diagram of a network packet having orthocodes to enable a wake on powerline activity technique in a PLC network.

FIG. 2 depicts an example conceptual diagram of a network packet having orthocodes to enable a wake on powerline activity technique in a PLC network. FIG. 2 depicts a network packet 200 having a preamble 202, a header 204 and a payload 206. The header 204 may include information about the protocol (e.g., protocol version, etc.), and one or more network addresses (e.g., a source address, a destination address, etc.), etc. The payload 206 includes the data to be sent via the network packet 200. The preamble 202 is typically utilized in a PLC system for phase synchronization of OFDM carriers and includes a phase table 201. For example, the phase table 201 stores one or more polyphase codes to support phase synchronization. The wake on powerline activity technique utilizes the preamble 202 of the network packet 200 by inserting an orthocode 203 (or an orthocode sequence) specific to a particular PLC device in the phase table 201 of the preamble 202.

In some implementations, when the PLC device 102 (as described above with reference to FIG. 1) determines to wake up the PLC device 108, the packet management unit 104 replaces one or more default polyphase codes stored in the phase table 201 with an orthocode or an orthocode sequence assigned to the PLC device 108. The packet management unit 104 sends the network packet 200 over the powerline communication medium 111. The packet management unit 110 in the PLC device 108 detects the orthocode or the orthocode sequence in the network packet 200. In some implementations, the packet management unit 104 replaces the default value of a reference polyphase code (known to the packet management unit 110) in the phase table 201 with the orthocode or the orthocode sequence assigned to the PLC device 108. In other implementations, the packet management unit 104 may replace one of the polyphase codes in the phase table 201 with the orthocode or the orthocode sequence assigned to the PLC device 108, and the packet management unit 110 may scan through the polyphase codes in the phase table 201 to determine one of the polyphase codes is associated with the orthocode assigned to the PLC device 108. In some implementations, when an orthocode is assigned to the PLC device 108, the packet management unit 104 can send a network packet including the orthocode assigned to the PLC device 108 to wake up the PLC device 108. In other implementations, when an orthocode sequence is assigned to the PLC device 108, the packet management unit 104 can send a network packet including the orthocode sequence assigned to the PLC device 108 to wake up the PLC device 108. For example, the orthocode sequence assigned to the PLC device 108 includes a first orthocode and a second orthocode, and the packet management unit 104 sends a single network packet having the first orthocode included in a first preamble of the network packet, and a second orthocode included in the second preamble of the same network packet. It is noted, however, that in other implementations, when an orthocode sequence is assigned to the PLC device 108, the packet management unit 104 may send a sequence of codes using two or more network packets to wake up the PLC device 108.

FIG. 2 depicts the network packet 200 as a network packet for a PLC network, however the network packet 200 may be a network packet in any OFDM communication network (e.g., WLAN, etc.). For other OFDM communication networks the network packet 200 has a similar structure for the preamble 202 which includes the phase table 201 having one or more polyphase codes. A first network device in the OFDM communication network can insert the orthocode 203 (assigned to a second network device in the OFDM communication network) in the phase table 201 to wake up the second network device.

Figure 3:
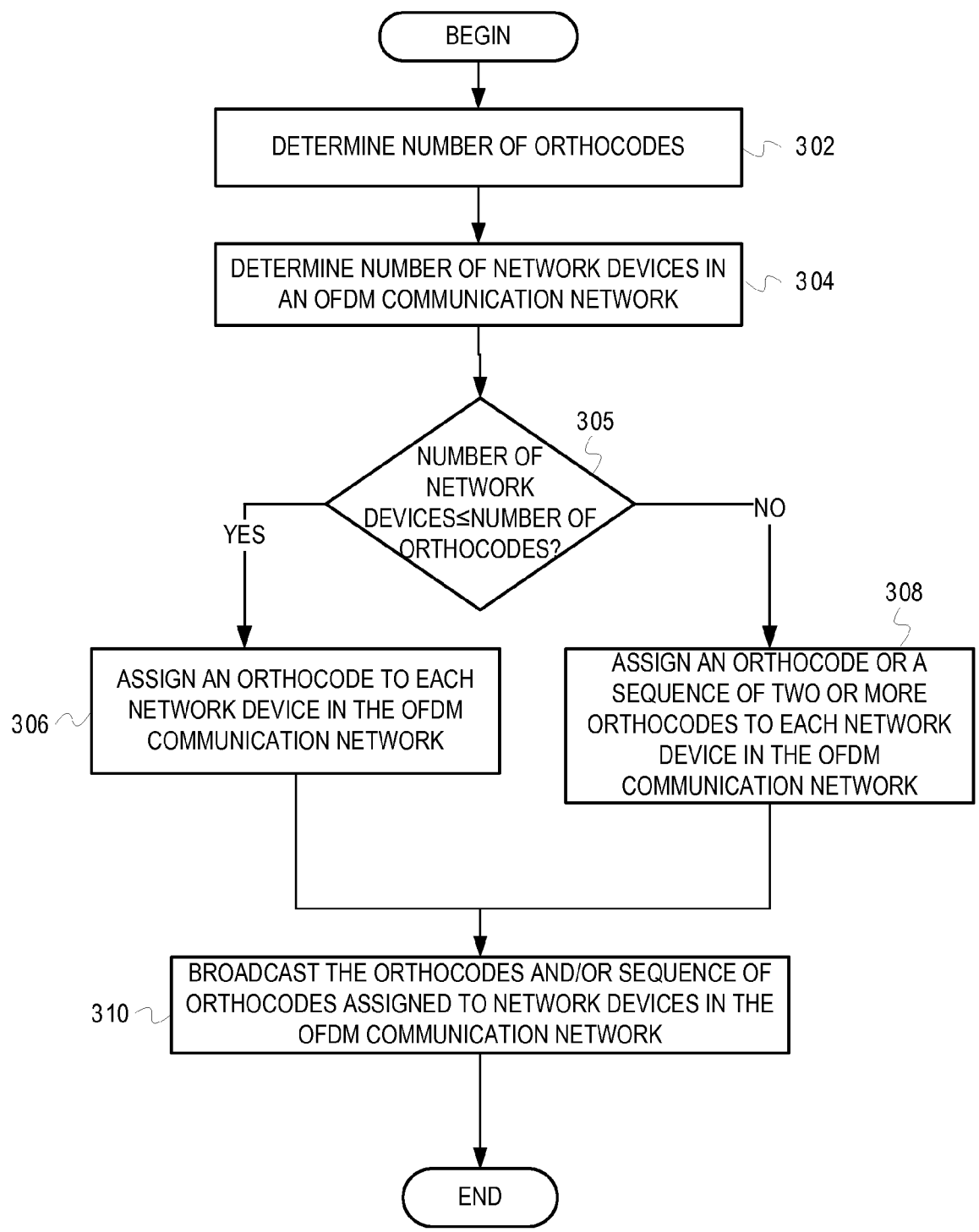
FIG. 3 illustrates a flow diagram of example operations to assign orthocodes to network devices in an OFDM communication network.

FIG. 3 illustrates a flow diagram of example operations to assign orthocodes to network devices in an OFDM communication network.

At block 302, a number of orthocodes is determined. In one implementation, the packet management unit 116 of a PLC device configured as the central coordinator determines the number of orthocodes after generating a set of orthocodes. For example, the packet management unit 116 in the PLC device 114 (shown in FIG. 1) generates a set of polyphase codes such that each polyphase code in the set has a strong auto-correlation function and a weak cross-correlation with other polyphase codes in the set. The polyphase codes in the set comprise the orthocodes which can be assigned to PLC devices in the PLC network 100. The packet management unit 116 determines the number of orthocodes in the set, and the flow continues to block 304.

At block 304, a number of network devices in the OFDM communication network is determined. In one implementation, the packet management unit 116 determines the number of PLC devices in the PLC network 100. For example, the packet management unit 116 maintains a data structure (e.g., a list, a table, etc.) to keep a track of the PLC devices in the PLC network 100 at any time instance. The packet management unit 116 determines the number of PLC devices in the PLC network 100 from the data structure, and the flow continues to block 306.

At block 305, it is determined whether the number of network devices is less than or equal to the number of orthocodes. In one implementation, the packet management unit 116 determines whether the number of PLC devices in the PLC network 100 is less than or equal to the number of orthocodes. For example, the packet management unit 116 determines whether the number of PLC devices (determined at block 304) is less than or equal to the number of orthocodes (determined at block 302). If the number of PLC devices is less than or equal to the number of orthocodes, control flows to block 306. If the number of PLC devices is greater than the number of orthocodes, control flows to block 308.

At block 306, an orthocode is assigned to each network device in the OFDM communication network. In one implementation, the packet management unit 116 assigns an orthocode to each of the PLC devices in the PLC network 100. For example, the packet management unit 116 sends a distinct orthocode to each of the PLC devices. The packet management unit 116 instructs the PLC devices to store their respective orthocodes and wake up on detecting their respective orthocodes in a preamble of a network packet. The packet management unit 116 also keeps a track of the orthocodes assigned to each of the PLC devices. For example, the packet management unit 116 maintains a mapping table to map orthocodes assigned to the PLC devices and their respective network addresses. The flow continues to block 310.

At block 308, an orthocode or a sequence of two or more orthocodes is assigned to each of the network devices in the OFDM communication network. In one implementation, the packet management unit 116 assigns an orthocode or a sequence of two or more orthocodes to each of the PLC devices in the PLC network 100. For example, the packet management unit 116 may determine that the number of PLC devices is greater than the number of orthocodes. The packet management unit 116 generates combinations of two or more orthocodes to form distinct orthocode sequences (as described above in FIG. 1). The packet management unit 116 then assigns either an orthocode or a distinct orthocode sequence to each of the PLC devices. In one implementation, the packet management unit 116 sends the orthocode/orthocode sequence to each of the PLC devices. The packet management unit 116 instructs the PLC devices to store their respective orthocode/orthocode sequence and wake up on detecting their respective orthocode/orthocode sequence in a preamble of a network packet. The packet management unit 116 also keeps a track of the orthocode/orthocode sequence assigned to each of the PLC devices. For example, the packet management unit 116 maintains a mapping table to map orthocodes/orthocode sequences assigned to the PLC devices and their respective network addresses. As described above, in some implementations, one or more group of PLC devices may be defined in the PLC network 100 and the packet management unit 116 may assign an orthocode or a sequence of two or more orthocodes to each of the group of PLC devices.

In some implementations, a PLC device may be part of two or more groups and the packet management unit 116 may assign two or more orthocodes/orthocode sequences associated with the two or more groups to the PLC device. The flow continues to block 310.

At block 310, the orthocodes and/or sequence of orthocodes assigned to network devices in the communication network are broadcast. In one implementation, the packet management unit 116 broadcasts the orthocodes and the orthocode sequences (if orthocode sequences were assigned at block 308) to the PLC devices in the PLC network 100. For example, the packet management unit 116 sends information about the mapping between network addresses of the PLC devices and orthocodes/orthocode sequences to each of the PLC devices. Broadcasting the mapping information allows each of the PLC devices to learn about the orthocodes/orthocode sequences assigned to the remaining PLC devices in the PLC network 100. The PLC devices can store the mapping information (e.g., as a mapping table) in their memory and then utilize the appropriate orthocode/orthocode sequence of a PLC device to wake up the particular PLC device in the PLC network 100.

Figure 4:
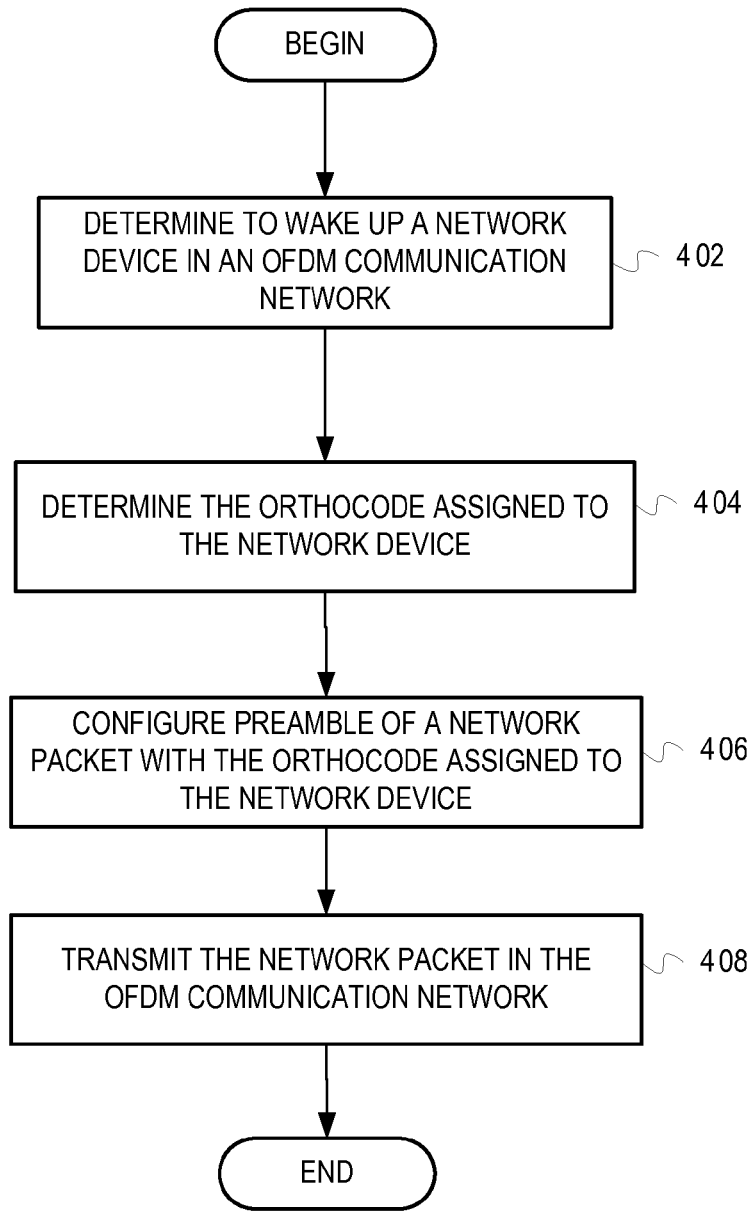
FIG. 4 illustrates a flow diagram of example operations to configure a network packet to wake up a network device in an OFDM communication network.

FIG. 4 illustrates a flow diagram of example operations to configure a network packet to wake up a network device in an OFDM communication network.

At block 402, it is determined to wake up a network device in an OFDM communication network. In one implementation, the packet management unit 104 (in the PLC device 102 as described above with reference to FIG. 1) determines to wake up the PLC device 108 in the PLC network 100. For example, the packet management unit 104 may determine that the PLC device 102 is scheduled to communicate with the PLC device 108. The packet management unit 104 may further determine whether the PLC device 108 is in an active or sleep mode (e.g., based on a predetermined sleep schedule). The packet management unit 104 can then determine to wake up the PLC device 108 from its sleep mode and the flow continues at block 404.

At block 404, the orthocode assigned to the network device is determined. In one implementation, the packet management unit 104 determines the orthocode assigned to the PLC device 108. For example, the packet management unit 104 determines the orthocode assigned to wake up the PLC device from a mapping table stored in the memory of the PLC device 102. In some implementations, an orthocode sequence may be assigned to wake up the PLC device 108. The packet management unit 104 can determined the orthocode sequence assigned to wake up the PLC device 108 from the mapping table. The flow continues at block 406.

At block 406, a preamble of a network packet is configured with the orthocode assigned to the network device. In one implementation, the packet management unit 104 configures the preamble 202 of the network packet 200 (as described above with reference to FIG. 2) with the orthocode assigned to the PLC device 108. For example, the packet management unit 104 inserts the orthocode in the phase table 201 of the preamble 202. In some implementations, when an orthocode sequence is assigned to wake up the PLC device 108, the packet management unit 104 inserts the orthocode sequence into the phase table 201 of the preamble 202. The flow continues at block 408.

At block 408, the network packet is transmitted in the OFDM communication network. In one implementation, the packet management unit 104 transmits the network packet in the PLC network 100. For example, the packet management unit 104 transmits the network packet 200 over the powerline communication medium 111. In some implementations, the packet management unit 104 may send the network packet 200 to one or more units of the PLC device 102 for transmitting the network packet 200 over the powerline communication medium 111. For example, the packet management unit 104 may send the network packet 200 to one or more network interface units in the PLC device 102 which may configure the header 204 and the payload 206 in the network packet 200 and then transmit the network packet 200 over the powerline communication medium 111.

Figure 5:
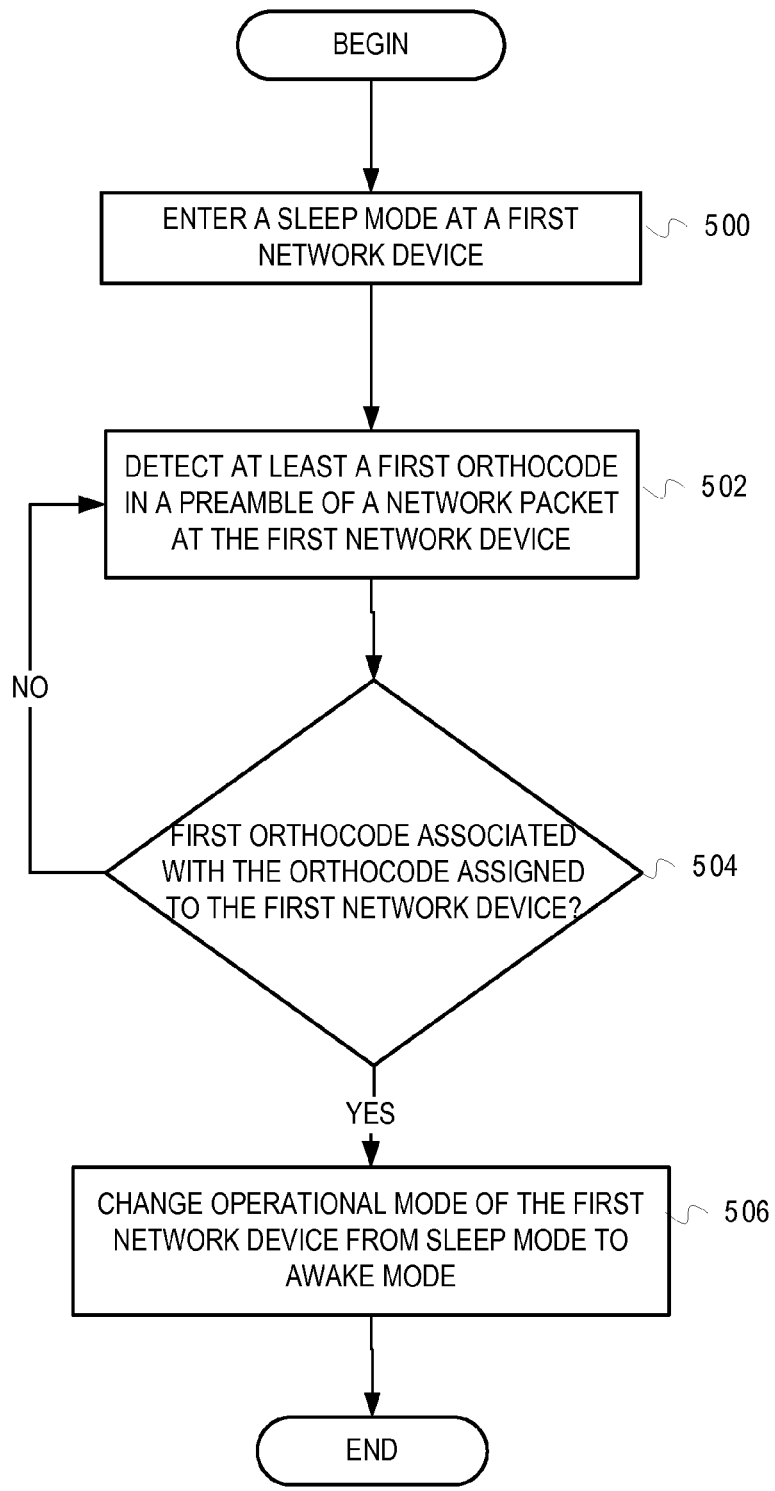
FIG. 5 illustrates a flow diagram of example operations to change an operational mode of a first network device based on a network packet received from a second network device.

FIG. 5 illustrates a flow diagram of example operations to change an operational mode of a first network device based on a network packet received from a network device.

At block 500, a sleep mode is entered at a first network device. In one implementation, the PLC device 108 (in the PLC network 100 as described above with reference to FIG. 1) enters the sleep mode. For example, the power management unit 112 causes one or more components in the PLC device 108 to enter the sleep mode. For example, the power management unit 112 may instruct one or more components in the PLC device 108 to enter the sleep mode, or may selectively reduce (or turn off) the power provided to the one or more components, based on a pre-determined sleep schedule for the PLC device 108. During the sleep mode, one or more components (e.g., a band-pass filter, etc.) of the PLC device 108 are on (e.g., in a low power mode) in order to detect any activity (such as a wake up signal) on the powerline communication medium 111. The power management unit 112 may also remain on (e.g., in a low power mode) to change the sleep mode of the PLC device 108 to its awake mode. The flow continues at block 502.

At block 502, at least a first orthocode is detected in a preamble of a network packet at the first network device. In one implementation, the packet management unit 110 in the PLC device 108 detects an orthocode in the preamble 202 of the network packet 200. For example, the packet management unit 110 reads a base reference polyphase code in the phase table 201 of the preamble 202. In some implementations, the packet management unit 110 may detect an orthocode sequence in the preamble 202 of the network packet 200. The flow then continues at block 504.

At block 504, it is determined whether the first orthocode is associated with the orthocode assigned to the first network device. In one implementation, the packet management unit 110 determines whether the orthocode detected at block 502 is associated with the orthocode assigned to the PLC device 108. For example, the packet management unit 110 computes a correlation function of the orthocode detected at block 502 with the orthocode assigned to the PLC device 108. In one implementation, the packet management unit 110 determines that the orthocode detected at block 502 is associated with the orthocode assigned to the PLC device 108 when the correlation function is strong (e.g., the value of correlation function is greater than a correlation threshold). The packet management unit 110 may determine that the orthocode detected at block 502 is not associated with the orthocode assigned to the PLC device 108 when the correlation function is weak (i.e., the value of correlation function is less than a correlation threshold). In some implementations, the packet management unit 110 may detect an orthocode sequence at block 502. The packet management unit 110 then computes a correlation function with the orthocode sequence assigned to the PLC device 108 to determine whether the orthocode sequence detected at block 502 is associated with the orthocode sequence assigned to the PLC device 108. The packet management unit 110 may determine that the orthocode sequence detected at block 502 is associated with the orthocode sequence assigned to the PLC device 108 when the correlation function is strong (e.g., the value of correlation function is greater than the correlation threshold). The packet management unit 110 may determine that the orthocode sequence detected at block 502 is not associated with the orthocode sequence assigned to the PLC device 108 when the correlation function is weak (i.e., the value of correlation function is less than the correlation threshold). The flow then continues to block 506.

At block 506, the operational mode of the first network device is changed from the sleep mode to an awake mode. In one implementation, the packet management unit 110 instructs the power management unit 112 to change the operational mode of the PLC device 108 from the sleep mode to the awake mode. For example, the packet management unit 110 may instruct the power management unit 112 to turn on certain components of the PLC device 108. In some implementations, the power management unit 112 may cause one or more components of the PLC device 108 to enter the awake mode, or may selectively increase (or turn on) the power provided to the one or more components. In other implementations, the power management unit 112 may instruct one or more units in the PLC device 108 to turn on one or more components of the PLC device 108.

It is noted that although FIGS. 1-5 describe that orthocodes/orthocode sequences may be assigned to PLC devices in the PLC network 100 by the PLC device 114 that is configured as a central coordinator, in some implementations the PLC devices that are not configured as a central coordinator in the PLC network 100 may also assign orthocodes/orthocode sequences amongst themselves (i.e., the orthocodes may be assigned in a distributed manner). For example, the PLC device 108 can assign orthocodes to the PLC devices 102, 114, and 120 in the PLC network 100. In some implementations, the PLC device 108 may assign orthocodes/orthocode sequences to the PLC devices 102, 114, and 120 when there is no central coordinator in the PLC network 100. In other implementations, the PLC device 108 may assign orthocodes/ orthocode sequences to the PLC devices 102, 114, and 120 in the PLC network 100 in conjunction with the central coordinator. Once the PLC device 108 determines the orthocodes/ orthocode sequences for the PLC devices 102, 114, and 120, the PLC device 108 can broadcast the orthocodes/orthocode sequences in the PLC network 100. In some implementations, the central coordinator may assign the same orthocode to all PLC devices in the PLC network 100. The central coordinator or one of the PLC devices in the PLC network can then utilize the orthocode to wake up the remaining PLC devices in the PLC network 100. In other implementations, each of the PLC devices in the PLC network may assign orthocodes to themselves and broadcast their respective orthocodes in the PLC network 100. For example, when a PLC device joins the PLC network 100, the PLC device may determine an orthocode based on the orthocodes in preambles of network packets being transmitted in the PLC network 100. The PLC device can determine an orthocode for itself in accordance with the orthocodes included in preambles of network packets being transmitted in the PLC network 100 (such that the orthocode assigned to itself is orthogonal to each of the other orthocodes included in the preambles of the network packets). In some implementations, when a PLC device joins the PLC network 100, the PLC device may request a list of orthocodes from the central coordinator of the PLC network 100. The list of orthocodes may include information about available orthocodes (which have not been assigned to any of the PLC devices) and assigned orthocodes. The PLC device on receiving the list of orthocodes from the central coordinator can determine an orthocode to be assigned to itself from the list. In some implementations, the list of orthocodes may not include information about available orthocodes and assigned orthocodes. However, on receiving the list, the PLC device can determine the orthocodes which are assigned to other PLC devices (based on ongoing transmissions in the PLC network 100), and the orthocodes which are available. The PLC device can then assign one of the available orthocodes to itself. It is noted that in other implementations, the central coordinator may send the list of orthocodes to each of the PLC devices joining the PLC network 100 instead of a PLC device requesting the central coordinator for the list of orthocodes. The PLC device can broadcast the orthocode assigned to itself which can be utilized by other PLC devices in the PLC network 100 to wake up the PLC device.

In some implementations, orthocodes/orthocode sequences may be determined amongst PLC devices in the PLC network 100 based on a mutual agreement instead of orthocodes/orthocode sequences being assigned to the PLC devices. For example, the PLC device 108 may agree with the PLC device 120 on an orthocode to wake up the PLC device 120. In some implementations, the PLC device 120 may agree on an orthocode (to wake up the PLC device 120) with more than one PLC devices (e.g., the PLC device 102 and the PLC device 108). The PLC devices 102 and 108 can then use the orthocode to wake up the PLC device 120. However, when the orthocode is sent from a PLC device (other than the PLC devices 102 and 108), the PLC device 120 may not be woken up from its sleep mode. In some implementations, the PLC device 120 may agree on an orthocode sequence with one or more PLC devices to wake up the PLC device 120.

In some implementations, orthocodes or orthocode sequences may be utilized to change an operational mode of a PLC device in the PLC network 100 to intermediate states. For example, certain intermediate states between the sleep mode and the awake mode may exist for the PLC device 108. In an intermediate state between the sleep mode and the awake mode, certain components of the PLC device 108 which are turned off in the sleep mode may be turned on. Similarly, certain components of the PLC device 108 which are turned on during the awake mode may be turned off during the intermediate state. In one implementation, the PLC device 114 may assign an orthocode to the PLC device 108 corresponding to one of its intermediate states. When the PLC device 108 receives the orthocode from one or more PLC devices in the PLC network 100, the packet management unit 110 may change the operational mode of the PLC device 108 to the intermediate state. In some implementations, the PLC device 114 may assign an orthocode sequence corresponding to the intermediate state of the PLC device 108. For example, when the number of orthocodes is smaller than the number of intermediate states for PLC devices in the PLC network 100, the PLC device 114 may assign orthocode sequences for intermediate states of the PLC devices.

In some implementations, orthocodes/orthocode sequences may be agreed upon amongst two or more PLC devices in the PLC network 100 for changing the operational mode of a PLC device to an intermediate state. For example, the PLC device 120 may agree on an orthocode sequence with the PLC devices 102 and 108 to change the operational mode of the PLC device 120 to an intermediate state. When the packet management unit 122 receives the orthocode sequence from the PLC device 102 or the PLC device 108, the packet management unit 122 in the PLC device 120 may change the operational mode of the PLC device 120 to the intermediate state. Similar orthocodes/orthocode sequences corresponding to intermediate states of one or more PLC devices may be agreed upon amongst other PLC devices in the PLC network 100.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 6:
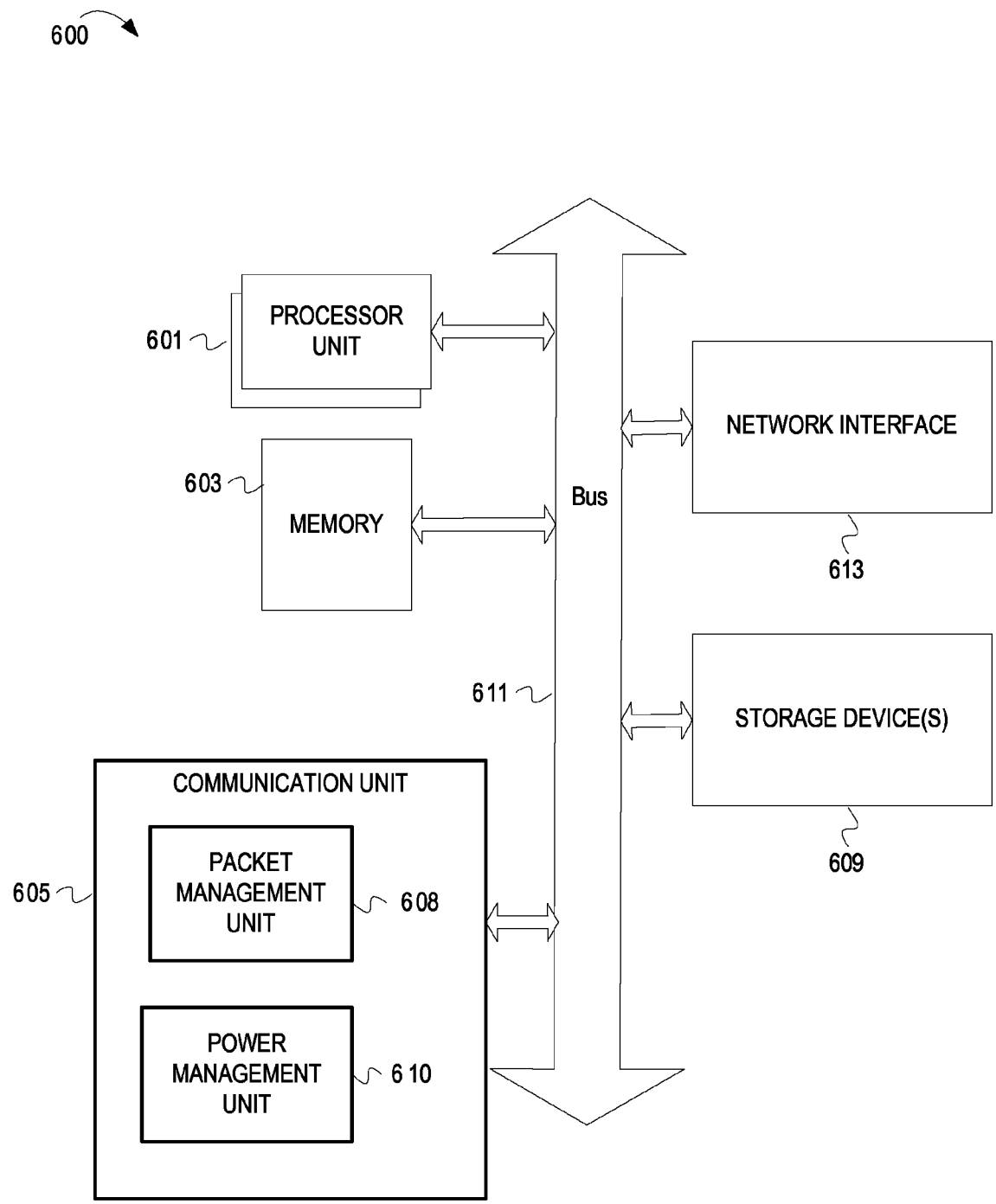
FIG. 6 depicts an example network device.

FIG. 6 depicts an example network device 600. In some implementations, the network device 600 may be a PLC device (e.g., a computer, a laptop, an electronic door lock, a motion sensor, a smart appliance, etc.). The network device 600 may include a processor unit 601 (possibly including multiple processors, multiple cores, multiple nodes, and/or implementing multi-threading, etc.). The network device 600 may include memory 603. The memory 603 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or one or more of the above already described possible realizations of machine-readable media. The network device 600 may include a bus 611 (e.g., PCI, PCI-Express, AHB™, AXI™, NoC, etc.), a communication unit 605, a network interface 613, and a storage device(s) 609 (e.g., optical storage, magnetic storage, network attached storage, etc.). The network interface 613 may be a powerline interface, a WLAN interface, etc. In some embodiments, the network interface 613 may be embodied in the communication unit 605. The communication unit 605 may include one or more hardware and software components to change the operational mode of the network device 600 based on a received network packet. The communication unit 605 may be partially (or entirely) implemented in one or more integrated circuits (e.g., one or more application specific integrated circuits). The communication unit 605 also includes a packet management unit 608 and a power management unit 610. The packet management unit 608 includes one or more components to detect an orthocode in a preamble of the network packet and determine whether the detected orthocode is associated with the orthocode assigned to the network device 600. The packet management unit 608 can change the operational mode of the network device 600 from a sleep mode to an awake mode. In some implementations, the packet management unit 608 may change the operational mode of the PLC device 600 from the sleep mode/an intermediate state to another intermediate state. In some implementations, the network device 600 may act as a central coordinator for a communication network. When the network device 600 acts as a central coordinator for the communication network, the packet management unit 608 may assign orthocodes to network devices in the communication network. The packet management unit 608 may also broadcast the orthocodes assigned to the network devices in the communication network. The packet management unit 608 can interact with the power management unit 610 to change the operational mode of the network device 600. The power management unit 610 may turn on/off one or more components of the network device 600. The power management unit 610 may instruct one or more components in the network device 600 to turn on/off one or more components of the network device 600. The packet management unit 608 and the power management unit 610 facilitate the implementation of the wake on powerline activity technique as described above with reference to FIGS. 1-5 in the network device 600. One or more of these functionalities may be partially (or entirely) implemented in hardware or an application specific integrated circuit. Further, realizations may include fewer or additional components not illustrated in FIG. 6 (e.g., video cards, audio cards, additional network interfaces, peripheral devices, etc.). The processor unit 601, the storage device(s) 609, and the communication unit 605 are coupled to the bus 611. Although illustrated as being coupled to the bus 611, the memory 603 may be coupled to the processor unit 601.

While the embodiments are described with reference to various implementations and exploitations, it will be understood that these embodiments are illustrative and that the scope of the inventive subject matter is not limited to them. In general, techniques for implementing the wake on powerline activity technique as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    detecting at least a first orthogonal code included in a preamble of a network packet received at a first network device from a second network device in an orthogonal frequency division multiplexing (OFDM) communication network;
    determining whether the first orthogonal code is associated with a first assigned orthogonal code for the first network device, wherein the first assigned orthogonal code for the first network device is orthogonal to other assigned orthogonal codes for other network devices; and
    changing an operational mode of the first network device from a sleep mode to an awake mode in response to determining that the first orthogonal code is associated with the first assigned orthogonal code.

2. The method of claim 1, wherein:
    said determining whether the first orthogonal code is associated with the first assigned orthogonal code comprises determining a correlation function between the first orthogonal code and the first assigned orthogonal code; and
    said changing the operational mode of the first network device is based, at least in part, on the correlation function.

3. The method of claim 2, wherein said changing the operational mode comprises:
    changing the operational mode of the first network device when a value of the correlation function exceeds a correlation threshold.

4. The method of claim 1, wherein said changing the operational mode of the first network device to the awake mode comprises transitioning at least one component of the first network device to an ON state.

5. The method of claim 1, further comprising:
    detecting a second orthogonal code included in the preamble of the network packet received at the first network device from the second network device;
    determining whether the second orthogonal code included in the preamble is associated with a second assigned orthogonal code for the first network device, wherein the second assigned orthogonal code for the first network device is associated with an intermediate power state; and
    changing the operational mode of the first network device from the sleep mode to the intermediate power state in response to determining that the second orthogonal code is associated with the second assigned orthogonal code.

6. The method of claim 1, wherein the first assigned orthogonal code comprises a single orthogonal code that is unique to the first network device.

7. The method of claim 1, wherein the first network device is associated with a first group of network devices, and wherein the first assigned orthogonal code is the same as an orthogonal code assigned to the first group of network devices.

8. The method of claim 1, wherein the first assigned orthogonal code comprises an orthogonal code sequence, wherein the orthogonal code sequence is a sequence of two or more orthogonal codes.

9. The method of claim 1, wherein said changing the operational mode of the first network device comprises transitioning the first network device to the awake mode irrespective of a sleep schedule of the first network device.

10. The method of claim 1, wherein:
the OFDM communication network is a powerline communication (PLC) network, and
each of the first network device and the second network device implements a PLC protocol.

11. The method of claim 10, wherein the first assigned orthogonal code is received from a central coordinator of the PLC network.

12. A method comprising:
determining, at a first network device, a first orthogonal code assigned to a second network device in an orthogonal frequency division multiplexing (OFDM) communication network, wherein the first orthogonal code assigned to the second network device is orthogonal to other orthogonal codes assigned to other network devices of the OFDM communication network;
configuring a preamble of a network packet with the first orthogonal code assigned to the second network device; and
transmitting the network packet via the OFDM communication network to change an operational mode of the second network device from a sleep mode to an awake mode.

13. The method of claim 12, further comprising:
determining whether a number of network devices in the OFDM communication network is less than a number of orthogonal codes of a plurality of orthogonal codes for the OFDM communication network; and
assigning a unique orthogonal code to each of the network devices in response to determining that the number of network devices is less than the number of orthogonal codes.

14. The method of claim 12, further comprising:
determining whether the OFDM communication network includes a group of network devices;
assigning a second orthogonal code to the group of network devices; and
assigning a unique orthogonal code to each network device in the OFDM communication network that is not in the group of network devices.

15. The method of claim 12, further comprising:
determining whether a number of network devices in the OFDM communication network is greater than a number of orthogonal codes of a plurality of orthogonal codes for the OFDM communication network;
assigning a unique orthogonal code to each network device of a subset of the network devices in response to determining that the number of network devices is greater than the number of orthogonal codes; and
assigning a unique orthogonal code sequence to each network device that is not in the subset of the network devices.

16. The method of claim 12, further comprising:
assigning at least one orthogonal code of a plurality of orthogonal codes for the OFDM communication network to each of a plurality of network devices in the OFDM communication network based, at least in part, on a number of orthogonal codes of the plurality of orthogonal codes and a number of network devices of the plurality of network devices.

17. The method of claim 16, wherein said assigning at least one orthogonal code to each of the plurality of network devices further comprises:
dynamically assigning at least one orthogonal code to each of the plurality of network devices based, at least in part, on the number of network devices in the OFDM communication network at a given time instance.

18. The method of claim 12, wherein said configuring the preamble of the network packet with the first orthogonal code comprises inserting the first orthogonal code in a phase table of the preamble.

19. The method of claim 12, wherein,
the OFDM communication network is a powerline communication (PLC) network, and
each of the first network device and the second network device implements a PLC protocol.

20. A first network device comprising:
a network interface;
a packet management unit coupled with the network interface, the packet management unit configured to:
detect at least a first orthogonal code included in a preamble of a network packet received at the first network device from a second network device in an orthogonal frequency division multiplexing (OFDM) communication network;
determine whether the first orthogonal code is associated with a first assigned orthogonal code for the first network device, wherein the first assigned orthogonal code for the first network device is orthogonal to other assigned orthogonal codes for other network devices; and
a power management unit coupled with the network interface, the power management unit configured to:
change an operational mode of the first network device from a sleep mode to an awake mode in response to a determination that the first orthogonal code is associated with the first assigned orthogonal code.

21. The first network device of claim 20, wherein:
the packet management unit is configured to determine whether the first orthogonal code is associated with the first assigned orthogonal code based, at least in part, on determining a correlation function between the first orthogonal code and the first assigned orthogonal code; and
the power management unit is configured to change the operational mode of the first network device based, at least in part, on the correlation function.

22. The first network device of claim 21, wherein the power management unit is configured to:
change the operational mode of the first network device when a value of the correlation function exceeds a correlation threshold; and
determine not to change the operational mode of the first network device when the value of the correlation function does not exceed the correlation threshold.

23. The first network device of claim 20, wherein the first assigned orthogonal code comprises a single orthogonal code that is unique to the first network device.

24. The first network device of claim 20, wherein the first network device is associated with a first group of network devices, and wherein the first assigned orthogonal code is the same as an orthogonal code assigned to the first group of network devices.

25. The first network device of claim 20, wherein the first assigned orthogonal code comprises an orthogonal code sequence, wherein the orthogonal code sequence is a sequence of two or more orthogonal codes.

26. The first network device of claim 20, wherein:
the OFDM communication network is a powerline communication (PLC) network, and
each of the first network device and the second network device implements a PLC protocol.

27. A central coordinator device comprising:
a network interface;
a packet management unit coupled with the network interface, the packet management unit configured to:
- determine a first orthogonal code assigned to a first network device in a powerline communication (PLC) network, wherein the first orthogonal code assigned to the first network device is orthogonal to other orthogonal codes assigned to other network devices of the PLC network;
- configure a preamble of a network packet with the first orthogonal code assigned to the first network device; and
- transmit the network packet via the PLC network to change an operational mode of the first network device from a sleep mode to an awake mode.

28. The central coordinator of claim 27, wherein the packet management unit is further configured to:
- determine whether a number of network devices in the PLC network is less than a number of orthogonal codes of a plurality of orthogonal codes for the PLC network; and
- assign a unique orthogonal code to each of the network devices in response to determining that the number of network devices is less than the number of orthogonal codes.

29. The central coordinator of claim 27, wherein the packet management unit is further configured to:
- determine whether the PLC network includes a group of network devices;
- assign a second orthogonal code to the group of network devices; and
- assign a unique orthogonal code to each network device in the PLC network that is not in the group of network devices.

30. The central coordinator of claim 27, wherein the packet management unit is further configured to:
- determine whether a number of network devices in the PLC network is greater than a number of orthogonal codes of a plurality of orthogonal codes for the PLC network;
- assign a unique orthogonal code to each network device of a subset of the network devices in response to determining that the number of network devices is greater than the number of orthogonal codes; and
- assign a unique orthogonal code sequence to each network device that is not in the subset of the network devices.

31. The central coordinator of claim 27, wherein each of the first network device and the central coordinator implements a PLC protocol.

32. A non-transitory machine-readable storage medium having instructions stored therein, which when executed by a processor causes the processor to perform operations that comprise:
- detecting at least a first orthogonal code included in a preamble of a network packet received at a first network device from a second network device in an orthogonal frequency division multiplexing (OFDM) communication network;
- determining whether the first orthogonal code is associated with a first assigned orthogonal code for the first network device, wherein the first assigned orthogonal code for the first network device is orthogonal to other assigned orthogonal codes for other network devices; and
- changing an operational mode of the first network device from a sleep mode to an awake mode in response to determining that the first orthogonal code is associated with the first assigned orthogonal code.

* * * * *